Patented Feb. 26, 1924.

1,484,782

UNITED STATES PATENT OFFICE.

GEORGE W. HEISE, OF ELMHURST, NEW YORK, ASSIGNOR TO UNION CARBIDE & CARBON RESEARCH LABORATORIES, INC., A CORPORATION OF NEW YORK.

DEPOLARIZING MIXTURE AND METHOD OF PREPARING THE SAME.

No Drawing. Application filed January 30, 1922. Serial No. 532,919.

*To all whom it may concern:*

Be it known that I, GEORGE W. HEISE, a citizen of the United States, residing at Elmhurst, in the county of Queens and State of New York, have invented certain new and useful Improvements in Depolarizing Mixtures and Methods of Preparing the Same, of which the following is a specification.

This invention relates to a depolarizing mixture consisting essentially of manganese dioxide and carbon in a novel state of physical association and exhibiting a high degree of depolarizing efficiency in dry cells of the Leclanché type.

The invention also relates to a novel constituent employed in the preparation of such depolarizing mixtures and to methods of preparing such mixtures.

In the application of William R. Clymer, filed September 17, 1920, Serial No. 410,923, there is described and claimed a highly efficient depolarizing mixture obtained by milling together pyrolusite and a carbonaceous material until an extreme intimacy of contact between the carbon and the pyrolusite components exists and a highly favorable surface-exposure relation is obtained. The advantageous properties of such a mixture are ascribed in the said Clymer application, at least in part, to the fact that the carbon, being the softer component, interacts with the pyrolusite during the milling operation in such a fashion that the carbon coats the pyrolusite particles in the finished product, and my investigations tend to support this conclusion.

I have found that when certain pyrolusites which are relatively soft and friable are used in accordance with the Clymer proposal, the results are not so good as when the usual hard varieties of pyrolusite are so employed, indicating that the properties of the ultimate product of the joint milling are to some extent dependent upon the hardness of the pyrolusite used. One object of my invention is a process which will make it possible to produce equally good results with such friable varieties of pyrolusite.

My invention also includes improvements in the joint milling process wherein artificial manganese dioxide is the depolarizing constituent and wherein such artificial manganese dioxide is indurated to increase its subdividing action upon the carbonaceous constituent during milling.

I have found that by saturating varieties of manganese dioxide which are deficient in hardness with solutions of suitable salts and then drying the mixture so obtained, the manganese dioxide is so compacted and indurated that it becomes much better adapted for use in the joint milling process. The solutions with which the manganese dioxide is initially impregnated should preferably contain no substances which are detrimental to the action of a dry battery, since in the process hereinafter to be described the solid components of the solution remain in the depolarizing mix and hence in the finished battery. The electrolyte solution commonly employed in dry batteries, containing zinc chloride and ammonium chloride, obviously answers this requirement, and since it has the necessary indurating action it is my preferred agent for the purpose. A specific example will serve further to illustrate the invention:

A friable pyrolusite deficient in hardness is crushed to a fineness of about one-eighth ($\frac{1}{8}$) inch, saturated with zinc chloride-ammonium chloride electrolyte solution and allowed to dry. The resulting hard compact mass is then crushed, for example to pass a screen preferably not finer than 80 mesh. Petroleum coke calcined to about 1600° to 1800° C. and suitably crushed, is mixed with the indurated pyrolusite and the resulting mixture is then milled for several hours in a pebble mill or equivalent device for mechanical reduction. The times and methods of milling disclosed in the said Clymer applications are suitable, with the exception that wet milling is not adapted for use in connection with my invention.

While I have obtained good results using the carbon in an initially relatively coarse condition, as recommended in the Clymer application, I have also used carbon which was initially much finer, with equally good results.

The sufficiently milled mix is used in any suitable way in the preparation of the battery, as by forming it into depolarizing bobbins or tamping it into zinc cup electrodes around a carbon electrode centered in the cup. If electrolyte salts have been employed in indurating the manganese material, these will of course remain in the finished mix, and due allowance may be made for the salts so introduced when the mix is moistened with electrolyte solution during the construction of the battery.

The invention has been described in connection with the use of electrolyte salts as the indurating agent and in connection with highly calcined petroleum coke as the carbonaceous constituent of the depolarizing mix, but it will be apparent that indurating agents other than depolarizing salts may be employed subject to the limitations set forth in the above description, and that the invention is not limited to petroleum coke as a carbonaceous constituent, since graphite and other conductive forms of carbon are likewise suitable. The terms "indurated manganese dioxide" and "indurated pyrolusite" as used herein are not restricted to materials free from substances other than the manganese compound and the indurating agent, as other materials, for example a portion of the carbon to be used in the final mix, may also be present.

I claim:

1. Method of preparing a battery depolarizer, comprising subjecting a mixture containing indurated manganese dioxide and conductive carbon to a dry milling operation until the desired depolarizing efficiency is attained.

2. Method of preparing a battery depolarizer, comprising subjecting a mixture containing indurated pyrolusite and highly calcined petroleum coke to a dry milling operation until the desired depolarizing efficiency is attained.

3. A dry depolarizing mixture for electric batteries, comprising the product of the joint dry milling of manganese dioxide and conductive carbon, said mixture comprising particles of the respective components in the intimate physical association resulting from said milling operation and said mixture being further characterized by the presence therein of substances capable of exercising an indurating action on manganese dioxide.

4. A dry depolarizing mixture for electric batteries, comprising the product of the joint dry milling of pyrolusite and highly calcined petroleum coke, said mixture comprising particles of the respective components in the intimate physical association resulting from said milling operation and said mixture being further characterized by the presence therein of soluble salts capable of exercising an indurating action on pyrolusite.

5. Process of preparing friable manganese dioxide for use in the manufacture of depolarizing compositions, comprising impregnating the dioxide with an indurating agent.

6. Initially friable manganese dioxide impregnated with an indurating agent.

7. Dry, initially friable pyrolusite impregnated with electrolyte salts.

In testimony whereof, I affix my signature.

GEORGE W. HEISE.